US008684567B2

(12) United States Patent
Hsieh et al.

(10) Patent No.: US 8,684,567 B2
(45) Date of Patent: Apr. 1, 2014

(54) LAMP

(75) Inventors: Yi-Chu Hsieh, New Taipei (TW); Hui-Feng Jen, New Taipei (TW); Che-Hsin Liao, New Taipei (TW); Jia-Yi Juang, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 49 days.

(21) Appl. No.: 13/562,307

(22) Filed: Jul. 30, 2012

(65) Prior Publication Data

US 2013/0170230 A1 Jul. 4, 2013

Related U.S. Application Data

(60) Provisional application No. 61/582,399, filed on Jan. 1, 2012.

(30) Foreign Application Priority Data

Feb. 16, 2012 (TW) ............................ 101105083 A

(51) Int. Cl.
*B60Q 3/04* (2006.01)

(52) U.S. Cl.
USPC ........... 362/362; 362/365; 362/347; 362/375; 362/650

(58) Field of Classification Search
USPC .......... 362/362, 364, 365, 374, 375, 649, 650
See application file for complete search history.

(56) References Cited

U.S. PATENT DOCUMENTS

| | | | | |
|---|---|---|---|---|
| 3,372,302 | A * | 3/1968 | Fasola | 315/272 |
| 3,446,954 | A * | 5/1969 | Spiteri | 362/650 |
| 4,366,416 | A * | 12/1982 | Yokoyama | 315/58 |
| 4,516,054 | A * | 5/1985 | Shikama et al. | 315/71 |
| 6,488,510 | B2 * | 12/2002 | Li | 439/13 |
| 6,948,829 | B2 * | 9/2005 | Verdes et al. | 362/227 |
| 7,125,159 | B2 * | 10/2006 | Hirsch et al. | 362/651 |
| 7,384,163 | B2 * | 6/2008 | Yang | 362/95 |
| 8,215,280 | B2 * | 7/2012 | Furr | 123/197.4 |
| 8,226,270 | B2 * | 7/2012 | Yamamoto et al. | 362/294 |
| 8,398,266 | B2 * | 3/2013 | Wang | 362/249.02 |
| 2006/0291216 | A1 * | 12/2006 | Blumel et al. | 362/362 |
| 2012/0236602 | A1 * | 9/2012 | Flaherty et al. | 362/650 |

FOREIGN PATENT DOCUMENTS

| | | |
|---|---|---|
| TW | M332788 | 5/2008 |
| TW | I324236 | 5/2010 |
| TW | M391058 | 10/2010 |
| TW | 201104137 | 2/2011 |

(Continued)

*Primary Examiner* — John A Ward
(74) *Attorney, Agent, or Firm* — Jianq Chyun IP Office

(57) ABSTRACT

A lamp including a first housing, a second housing assembled with the first housing to form a housing assembly and a bulb base is provided. The second housing includes a first sidewall and a second sidewall perpendicularly connected to the first sidewall. The first sidewall has a first stop portion extending along a normal direction. The bulb base is inserted into a first opening of the housing assembly to be assembled to the housing assembly. The bulb base has a second opening, multiple catches arranged on an outer sidewall of the second opening in a circumference direction and a second stop portion. The second stop portion disposed on the catches is located on a rotation path of the first stop portion when the bulb base rotates relative to the housing assembly for limiting a rotation angle between the housing assembly and the bulb base.

11 Claims, 5 Drawing Sheets

(56) References Cited

FOREIGN PATENT DOCUMENTS

| | | |
|---|---|---|
| TW | M397481 | 2/2011 |
| TW | I343976 | 6/2011 |
| TW | 201122356 | 7/2011 |
| TW | M412304 | 9/2011 |
| TW | M414788 | 10/2011 |
| TW | M416019 | 11/2011 |
| TW | M422029 | 2/2012 |

* cited by examiner

LAMP

CROSS-REFERENCE TO RELATED APPLICATION

This application claims the priority benefits of U.S. provisional application Ser. No. 61/582,399, filed on Jan. 1, 2012 and Taiwan application serial no. 101105083, filed on Feb. 16, 2012. The entirety of each of the above-mentioned patent applications is hereby incorporated by reference herein and made a part of this specification.

BACKGROUND OF THE INVENTION

1. Field of the Invention

The present invention relates to a lamp, and more particularly, to a lamp in which a housing assembly is rotatable relative to a bulb base.

2. Description of Related Art

In our daily life, people usually use a table lamp to supplement light in a low illumination area of a room. For example, a low illumination area such as a desk or office table area can become a bright work environment by lighting a table lamp. A user can then do some reading or perform other work at the desk or office table without worrying about the deterioration of eyesight due to the insufficient light of the work environment.

A typical table lamp includes a lamp base, a bulb housing, and a bulb base. In a conventional way of assembling a table lamp, the bulb base is manually assembled with the bulb housing and then threaded into the lamp base. However, after the bulb base is threaded into the lamp base, the angle of a light illuminating surface of the table lamp is not necessary an illumination angle desired by the user. Therefore, a rework is required which includes detaching the bulb base from the lamp base and then a re-assembly after an initial position of the bulb base is adjusted. Therefore, the conventional table lamp is inconvenient to use.

SUMMARY OF THE INVENTION

Accordingly, the present invention is directed to a lamp in which a housing assembly is capable of rotating relative to a bulb base to adjust a light illuminating surface to a desired illumination angle.

The present invention provides a lamp including a first housing, a second housing, and a bulb base. The second housing includes a first sidewall and a second sidewall. The second sidewall is perpendicularly connected to the first sidewall. The first sidewall includes a first stop portion extending along a normal direction N of the first sidewall. The second housing is detachably assembled with the first housing to form a housing assembly. The housing assembly has a first opening. The bulb base is inserted into the first opening to be assembled with the housing assembly. The lamp base includes a second opening, a plurality of catches, and a second stop portion. The plurality of catches is disposed on an outer sidewall of the second opening along a circumference direction of the second opening. The second stop portion is disposed on one of the plurality of catches and located on a rotation path of the first stop portion when the bulb base and the housing assembly move relative to each other, to limit an angle of rotation of the housing assembly relative to the bulb base.

In one embodiment, the first stop portion is one of a rib and a stop block, and the second stop portion is the other of the rib and the stop block.

In one embodiment, the lamp further includes an annular friction element located between the housing assembly and the bulb base. The annular friction element has a round opening in communication with the first opening.

In one embodiment, a material of the annular friction element is a thermosetting plastic or a thermoplastic material.

In one embodiment, the first sidewall includes an inner surface, and the first stop portion projects from the inner surface.

In one embodiment, a recess is located at each of two sides of the first stop portion.

In one embodiment, the second sidewall includes a first surface and a second surface that are opposite to each other, and the annular friction element is disposed on the first surface, with the catches catching the second surface.

In one embodiment, the first housing has a first cutout, and the first cutout is disposed at an edge of the first housing and covers a portion of the first opening.

In one embodiment, the second housing has a second cutout. The second cutout is disposed at an edge of the second housing and positioned in correspondence with the first cutout. The second cutout and the first cutout cooperatively form the first opening.

In one embodiment, the first opening is disposed in the second sidewall of the second housing, and the first cutout of the first housing covers a portion of the first opening.

In one embodiment, the bulb base includes a main body and a base body. The main body has a cavity. The base body is detachably assembled in the cavity of main body and adapted to be inserted into the first opening. The second opening, the plurality of catches and the second stop portion are disposed on the base body.

In view of the foregoing, in the lamp of the present invention, the bulb base and the housing assembly are connected in a sleeving manner, such that the bulb base and the housing assembly are rotatable relative to each other. When the light illuminating surface of the housing assembly is not oriented as expected after the bulb base is threaded into the lamp base of the lamp, the user can adjust the angle of the light illuminating surface of the housing assembly relative to the user simply by rotating the housing assembly relative to the bulb base. In addition, the stop portions are disposed on the housing assembly and the bulb base, respectively, which can further limit an angle of the relative rotation between the bulb base and the housing assembly as well as limit the adjustment of the angle of the light illuminating surface relative to the user to be a slight adjustment.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
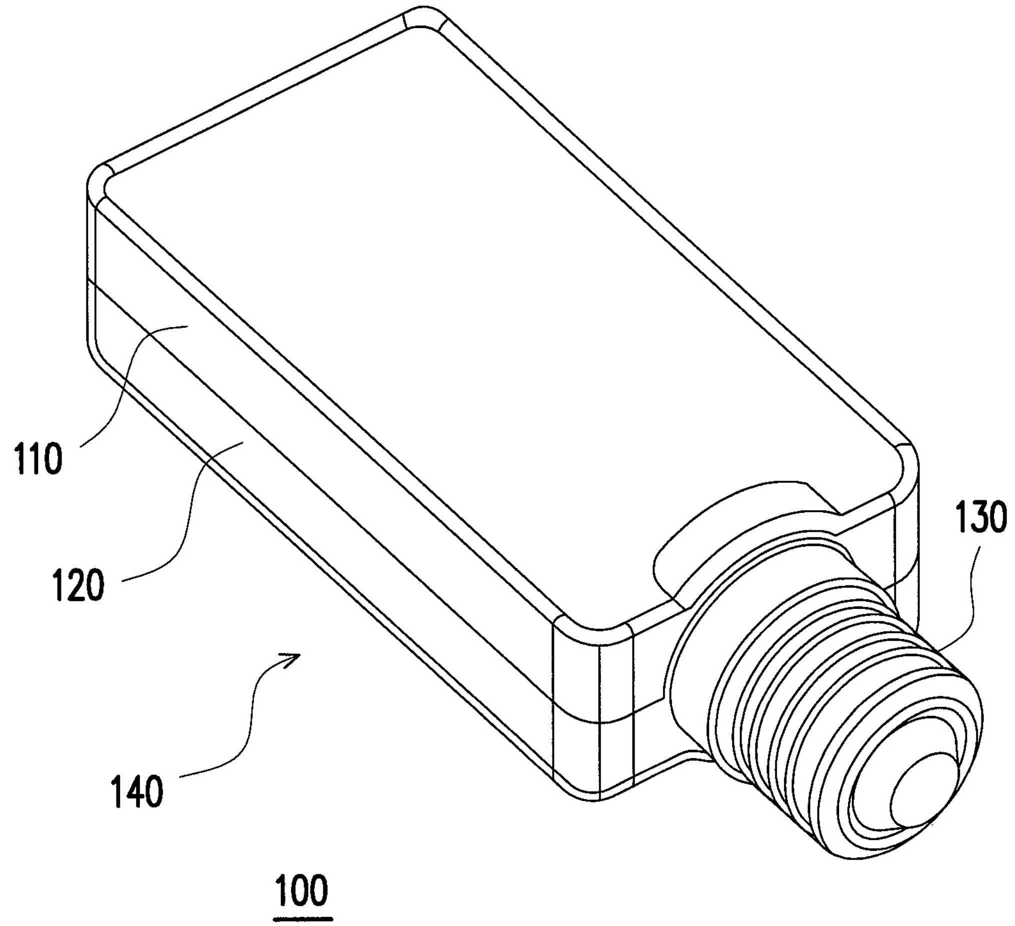
FIG. 1 is a perspective view of a lamp according to one embodiment of the present invention.
Figure 2:
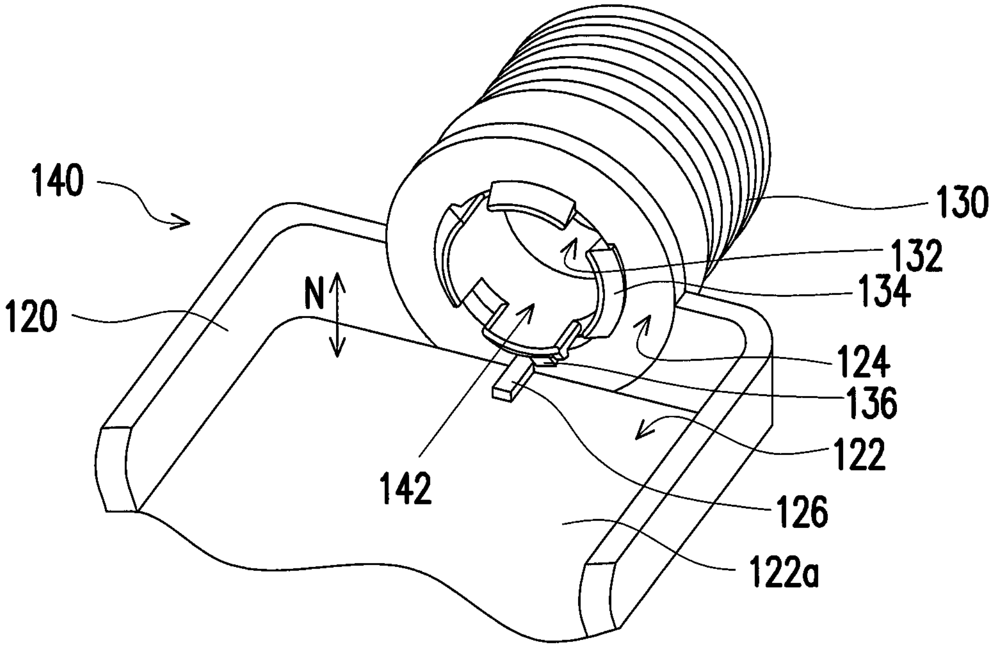
FIG. 2 is a partially enlarged view of a bulb base and a first stop portion of FIG. 1.
Figure 3:
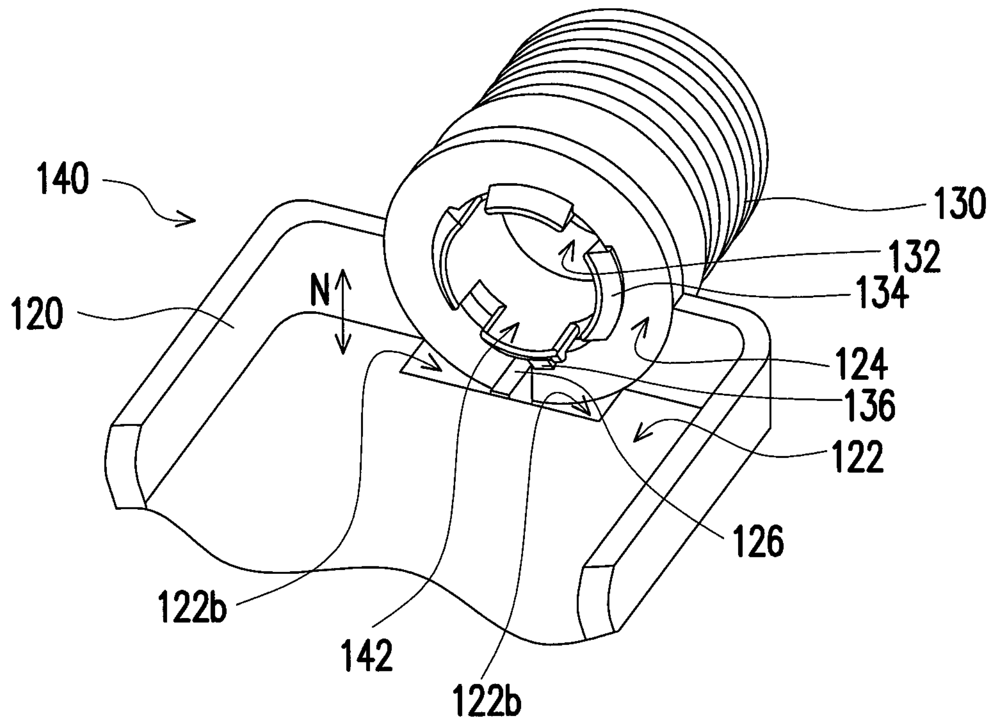
FIG. 3 is a partially enlarged view of the bulb base and the first stop portion of FIG. 1 according to another embodiment.
Figure 4:
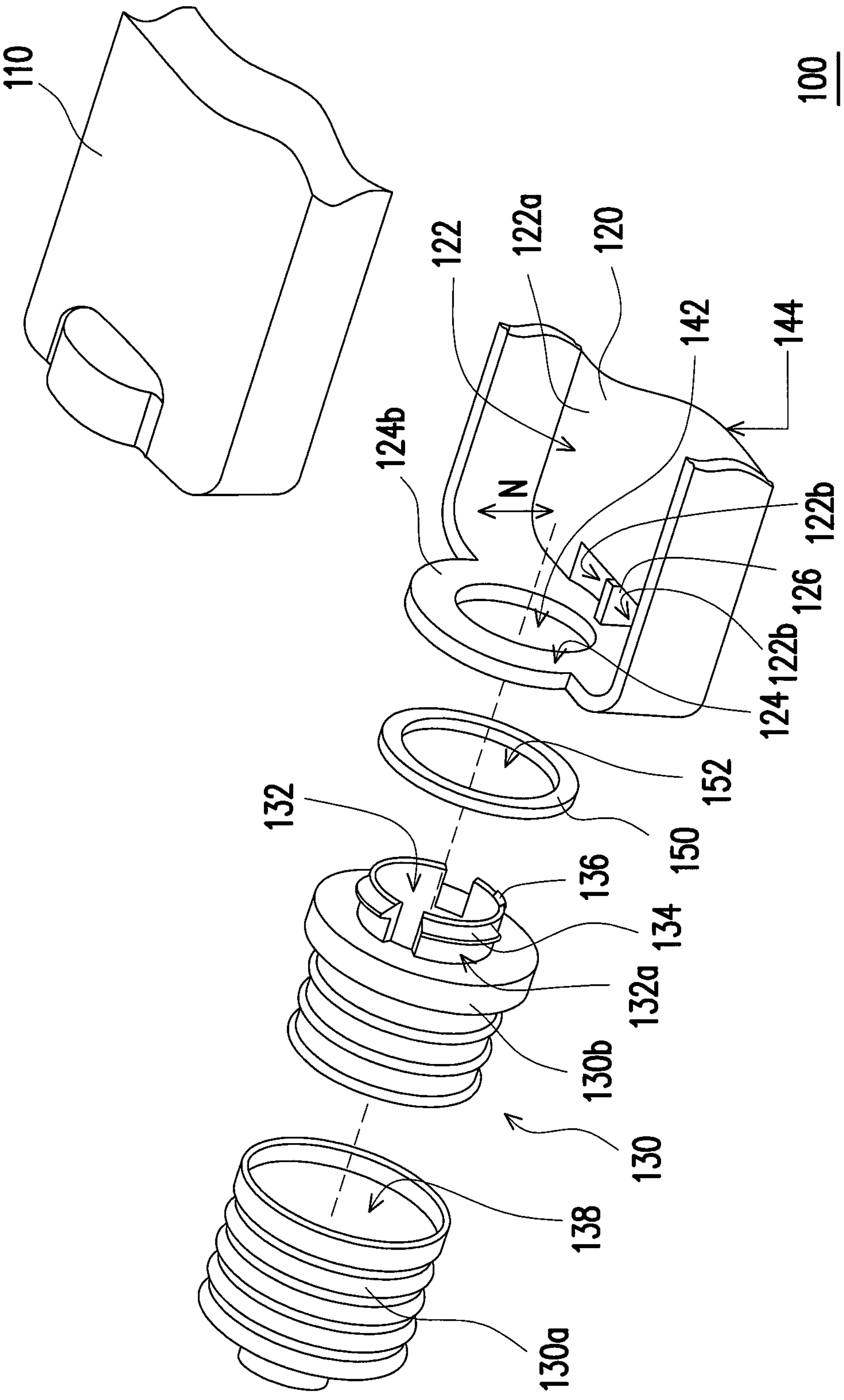
FIG. 4 is an exploded view of the lamp of FIG. 1.

FIG. 1 is a perspective view of a lamp according to one embodiment of the present invention. FIG. 2 is a partially enlarged view of a bulb base and a first stop portion of FIG. 1. FIG. 3 is a partially enlarged view of the bulb base and the first stop portion of FIG. 1 according to another embodiment. FIG. 4 is an exploded view of the lamp of FIG. 1. Referring to FIG. 1 to FIG. 4, in the present embodiment, the lamp 100 includes a first housing 110, a second housing 120, and a bulb base 130. The second housing 120 is detachably assembled with the first housing 110 to form a housing assembly 140. In addition, the housing assembly 140 has a first opening 142, and the bulb base 130 is inserted in the first opening 142 to be assembled with the housing assembly 140.

Specifically, the bulb base 130 includes a main body 130*a* and a base body 130*b*. The main body 130*a* includes a cavity 138, and the base body 130*b* is detachably assembled in the cavity 138 of the main body 130*b*. The base body 130*b* is provided with a second opening 132, catches 134, and a second stop portion 136. In the present embodiment, the main body 130*a* and the base body 130*b* are each provided with a thread through which the base body 130*b* is threaded into the main body 130*a*. In addition, the base body 130*b* is adapted to be inserted in the first opening 142 of the housing assembly 140, i.e. the base body 130*b* is located between the main body 130*a* and the housing assembly 140.

The second housing 120 of the present embodiment includes a first sidewall 122 and a second sidewall 124 that are perpendicularly connected to each other. The first sidewall 122 includes a first stop portion 126 extending along a normal direction N of the first sidewall 122. In the present embodiment, the first sidewall 122 includes an inner surface 122*a*, and the first stop portion 126 is a rib projecting from the inner surface 122*a*. However, the present invention is not intended to limit the first stop portion 126 on the first sidewall 122 to any particular form. In another embodiment, the first sidewall 122 includes a first stop portion 126, and a recess 122*b* is formed at each of two sides of the first stop portion 126. In addition, the bulb base 130 includes a second opening 132, a plurality of catches 134, and a second stop portion 136. These catches 134 are disposed on an outer sidewall 132*a* of the second opening 132 in a circumference direction of the second opening 132. The second stop portion 136 is formed on these catches 134, and the number of the second stop portion 136 is dependent on actual requirements. In the present embodiment, the second stop portion 136 is formed on one of the catches 134 and located on a rotation path of the first stop portion 126 as the bulb base 130 and the housing assembly 140 move relative to each other, to limit a rotation angle of the housing assembly 140 relative to the bulb base 130. It is noted that the first stop portion 126 is, for example, a rib, the second stop portion 136 is, for example, a stop block, and when the bulb base 130 and the housing assembly 140 move relative to each other, the second stop portion 136 of the catch 134 can be blocked by the first stop portion 126. However, the first stop portion 126 and the second portion 136 of the present invention should not be limited to any particular shape illustrated herein. In another embodiment, it is possible that the first stop portion 126 is, for example, a stop block and the second stop portion 136 is, for example, a rib.

In assembly of the lamp 100, the bulb base 130 is first inserted into the first opening 142 of the housing assembly 140, with the catches catching the second sidewall 124. As such, the assembly of the bulb base 130 to the housing assembly 140 is generally accomplished. The bulb base 130 is subsequently threaded into a lamp base (not shown) of the lamp 100.

With the above construction, when a light illuminating surface 144 of the housing assembly 140 is not oriented as expected after the bulb base 130 is threaded into the lamp base (not shown) of the lamp 100, the user can adjust the angle of the light illuminating surface 144 of the housing assembly 140 relative to the user simply by rotating the housing assembly 140 relative to the bulb base 130. It is noted that the provision of the second stop portion 136 and the first stop portion 126 can limit the angle of rotation between the bulb base 130 and the housing assembly 140, thereby avoiding tangling or even breakage of electrical wires in the lamp 100 due to an unlimited angle of rotation of the bulb base 130 relative to the housing assembly 140. At the same time, this can also limit the adjustment of the angle of the light illuminating surface 144 of the lamp 100 relative to the user to a slight adjustment instead of a significant adjustment.

Figure 5:
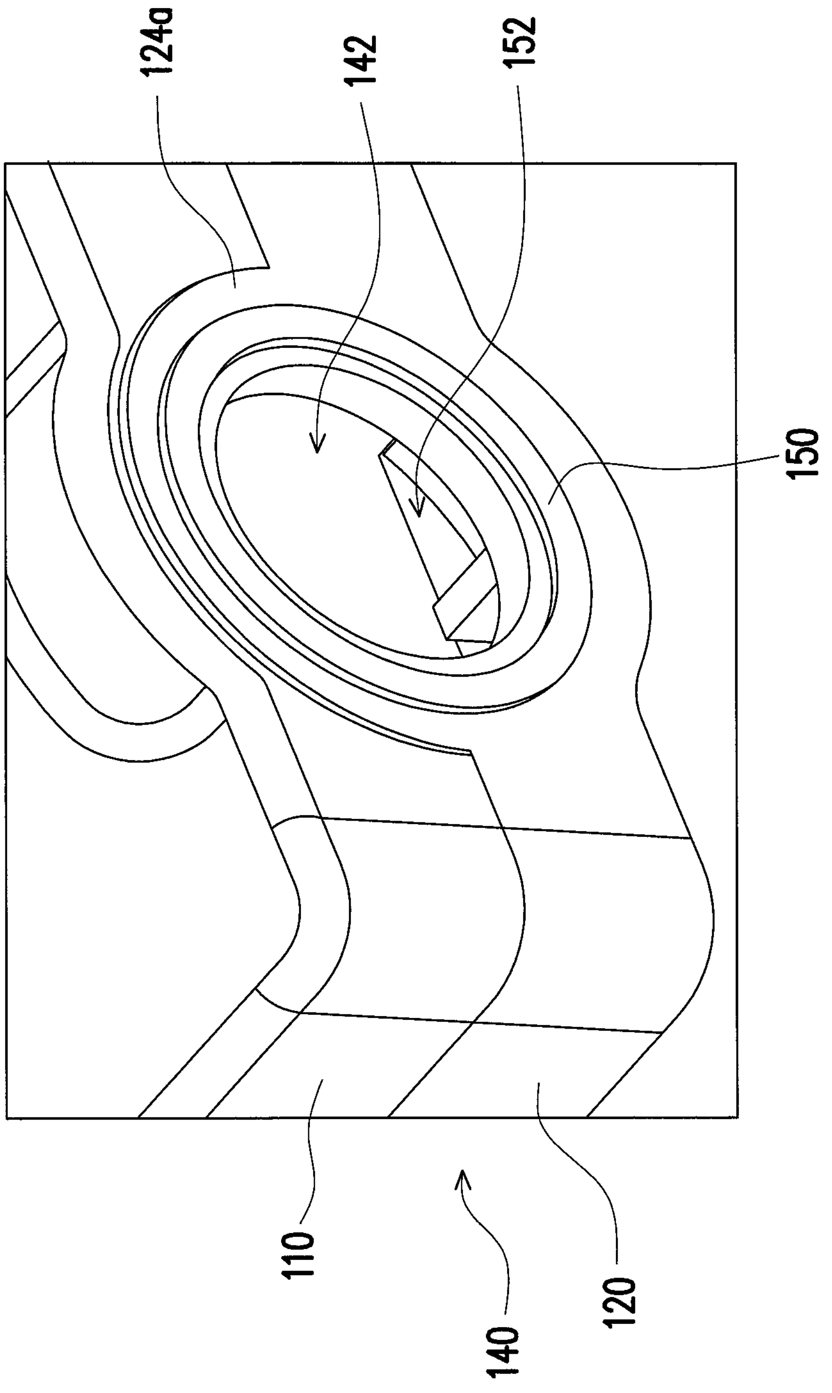
FIG. 5 is a partially enlarged view of a housing assembly and an annular friction element of FIG. 1.

FIG. 5 is a partially enlarged view of the housing assembly and an annular friction element of FIG. 1. Referring to FIG. 4 and FIG. 5, in the present embodiment, the lamp 100 may further include an annular friction element 150 disposed between the housing assembly 140 and the bulb base 130. The annular friction element 150 has a round opening 152 in communication with the first opening 142. The annular friction element 150 is disposed at an edge of the second housing 120, and the second sidewall 124 of the second housing 120 includes a first surface 124*a* and a second surface 124*b* opposite to each other. The annular friction element 150 is disposed on the first surface 124*a* of the second sidewall 124, and the bulb base 130 passes through the annular friction element 150 such that the catches 134 catch the second surface 124*b* of the second sidewall 124. In addition, the material of the annular friction element 150 may be a thermosetting plastic, a thermoplastic material or another composite material, which may be selected depending upon actual requirements. The provision of this annular friction element 150 enables the bulb base 130 and the housing assembly 140 to join more closely together, such that the relative rotation between the bulb base 130 and the housing assembly 140 cannot occur easily by means of a tight fit therebetween. On the other hand, the annular friction element 150 can also reduce any potential damage caused by the relative rotation between the bulb base 130 and the housing assembly 140 by buffering such rotation as well as reduce the noise caused by the friction between the bulb base 130 and the housing assembly 140.

Figure 6:
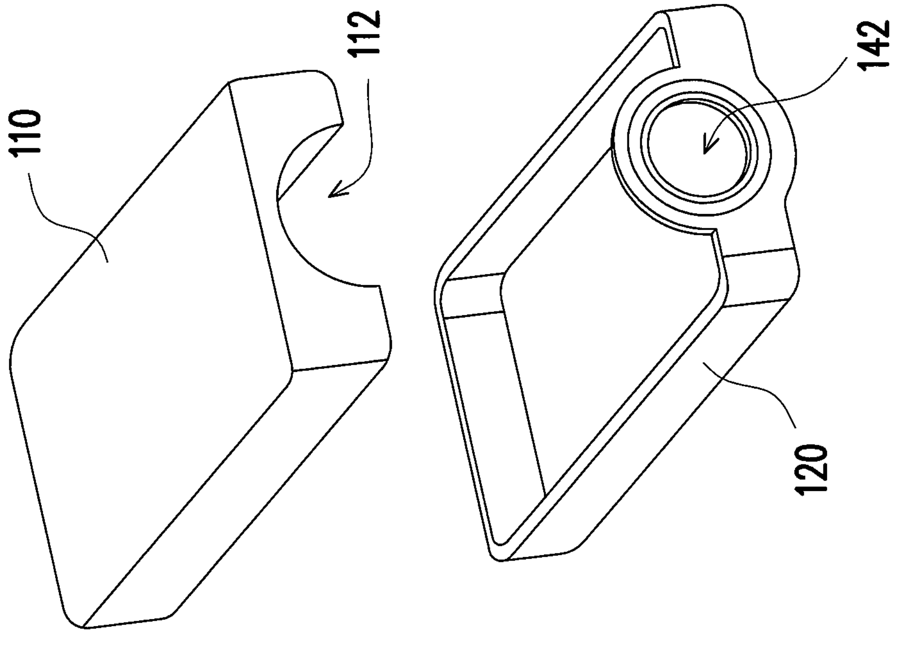
FIG. 6 is an exploded view of the first housing and the second housing of FIG. 1.

The present invention has no limits as to the formation of the first opening of the housing assembly. Below, the formation of the first opening is described by way of other embodiments illustrated in the accompanying figures. FIG. 6 is an exploded view of the first housing and the second housing of FIG. 1. Referring to FIG. 6, the second housing 120 of the present embodiment has a first opening 142 disposed in the second sidewall 124 of the second housing 120. On the other hand, the first housing 110 has a first cutout 112 at an edge of the first housing 110. When the second housing 120 and the first housing 110 are assembled together to form a housing assembly 140, the first cutout 112 covers a portion of sidewall of the first opening 142.

Figure 7:
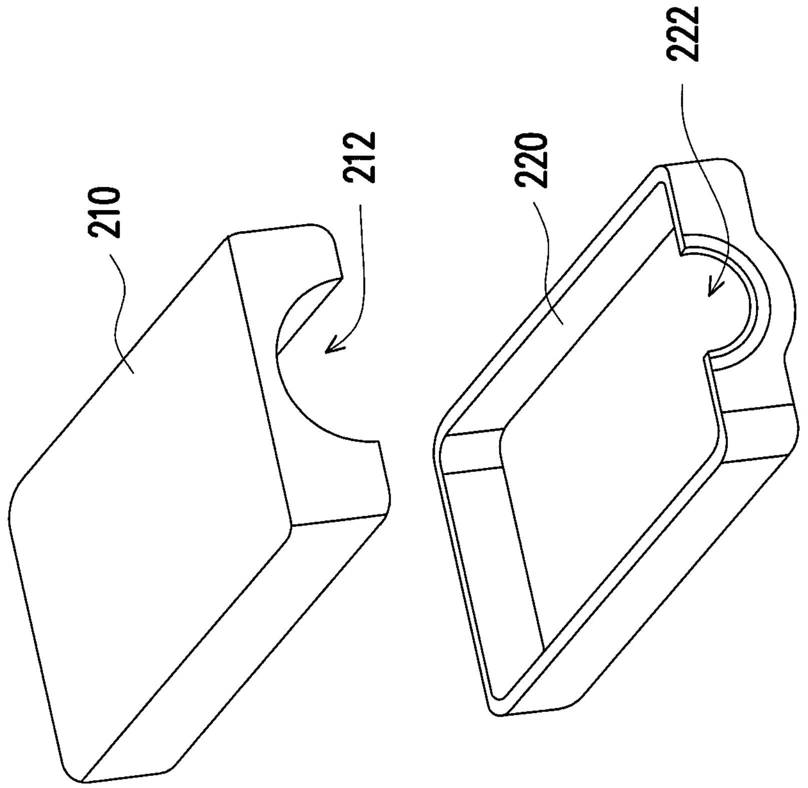
FIG. 7 is an exploded view of a housing assembly according to another embodiment of the present invention.

FIG. 7 is an exploded view of a housing assembly according to another embodiment of the present invention. Referring to FIG. 7, the first housing 110 of the present embodiment has a first cutout 212 disposed at an edge of the first housing 110. On the other hand, the second housing 220 has a second cutout 222 disposed at an edge of the second housing 220 and in correspondence with the first cutout 212. When the second housing 220 and the first housing 210 are assembled together, the first cutout 222 and the first cutout 212 cooperatively form the first opening 142 shown in FIG. 5.

In summary, in the lamp of the present invention, the bulb base and the housing assembly are connected with one sleeving around the other, such that the bulb base and the housing assembly are rotatable relative to each other. When the light illuminating surface of the housing assembly is not oriented as expected after the bulb base is threaded into the lamp base of the lamp, the user can adjust the angle of the light illuminating surface of the housing assembly relative to the user simply by rotating the housing assembly relative to the bulb base. In addition, the stop portions are disposed on the housing assembly and the bulb base, respectively, which can further limit an angle of the relative rotation between the bulb base and the housing assembly as well as limit the adjustment of the angle of the light illuminating surface relative to the user to be a slight adjustment.

Moreover, the provision of the annular friction element enables the bulb base and the housing assembly to join more closely together, such that the relative rotation between the bulb base and the housing assembly cannot occur easily by means of a tight fit therebetween. On the other hand, the annular friction element can also reduce any potential damage caused by the relative rotation between the bulb base and the housing assembly by buffering such relative rotation as well as reduce the noise caused the friction between the bulb base and the housing assembly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lamp comprising:

a first housing;

a second housing comprising a first sidewall and a second sidewall, wherein the second sidewall is perpendicularly connected to the first sidewall, the first sidewall comprises a first stop portion extending along a normal direction of the first sidewall, the second housing is detachably assembled with the first housing to form a housing assembly, and the housing assembly has a first opening; and a bulb base inserted into the first opening to be assembled with the housing assembly, wherein the lamp base comprises a second opening, a plurality of catches, and a second stop portion, and the catches are disposed on an outer sidewall of the second opening along a circumference direction of the second opening, the second stop portion is disposed on one of the catches and located on a rotation path of the first stop portion when the bulb base and the housing assembly move relative to each other, to limit an angle of rotation of the housing assembly relative to the bulb base.

2. The lamp according to claim 1, wherein the first stop portion is one of a rib and a stop block, and the second stop portion is the other of the rib and the stop block.

3. The lamp according to claim 1, further comprising an annular friction element located between the housing assembly and the bulb base, the annular friction element having a round opening in communication with the first opening.

4. The lamp according to claim 3, wherein a material of the annular friction element is a thermosetting plastic or a thermoplastic material.

5. The lamp according to claim 1, wherein the first sidewall comprises an inner surface, and the first stop portion projects from the inner surface.

6. The lamp according to claim 1, wherein a recess is located at each of two sides of the first stop portion.

7. The lamp according to claim 3, wherein the second sidewall comprises a first surface and a second surface that are opposite to each other, and the annular friction element is disposed on the first surface, with the catches catching the second surface.

8. The lamp according to claim 1, wherein the first housing has a first cutout, and the first cutout is disposed at an edge of the first housing and covers a portion of the first opening.

9. The lamp according to claim 8, wherein the second housing has a second cutout, the second cutout is disposed at an edge of the second housing and in correspondence with the first cutout, and the second cutout and the first cutout cooperatively form the first opening.

10. The lamp according to claim 8, wherein the first opening is disposed in the second sidewall of the second housing, and the first cutout of the first housing covers a portion of the first opening.

11. The lamp according to claim 1, wherein the bulb base comprises:

a main body having a cavity; and a base body detachably assembled in the cavity of main body and adapted to be inserted into the first opening, wherein the second opening, the plurality of catches and the second stop portion are disposed on the base body.

* * * * *